United States Patent [19]

Heiser

[11] 3,964,053

[45] June 15, 1976

[54] AIRCRAFT GUIDING SYSTEM

[75] Inventor: William H. Heiser, Ramsey, N.J.

[73] Assignee: International Telephone and Telegraph Corporation, Nutley, N.J.

[22] Filed: Mar. 15, 1957

[21] Appl. No.: 646,496

[52] U.S. Cl. .......................... 343/108 M; 244/3.13; 235/150.22; 244/185
[51] Int. Cl.² .......................................... G01S 1/08
[58] Field of Search .................... 244/14, 77, 14.55; 343/101, 117, 102, 106

[56] References Cited
UNITED STATES PATENTS

| | | | |
|---|---|---|---|
| 2,476,301 | 7/1949 | Jenks | 244/14 |
| 2,554,188 | 12/1951 | Guanella | 343/101 |
| 2,616,640 | 11/1952 | Bedford | 244/77 |
| R23,066 | 12/1948 | Moseley | 343/117 |

FOREIGN PATENTS OR APPLICATIONS 724,031  2/1955  United Kingdom............... 244/14.55

Primary Examiner—Verlin R. Pendegrass
Attorney, Agent, or Firm—John T. O'Halloran

EXEMPLARY CLAIM

1. A system adapted to guide an aircraft along a path defined by frequency modulated signals of a transmitted conical scan pattern, comprising a receiver carried by said aircraft to receive said signals, means to detect from said signals and the amplitude modulation of said signals caused by the movement of said aircraft relative to the axis of said conical scan pattern any rate of change of the direction of movement of said aircraft with respect to the nutation axis of said conical scan pattern, and means responsive to said detected rate of change to direct the movement of said aircraft along a path within said conical scan pattern defined by any line of constant scan modulation.

5 Claims, 7 Drawing Figures

Inventor
WILLIAM H. HEISER

AIRCRAFT GUIDING SYSTEM

This invention relates to aircraft guiding systems and more particularly to a form of radar landing system for aircraft.

The most commonly used systems for aircraft landing at airports are the instrument landing system (ILS) and the ground control approach (GCA). In the ILS system a localizer provides the lateral guidance that enables the airplane to approach the runway of the airport from the proper direction and a glide path provides an equisignal path type of guidance in the vertical plane analogous to the guidance in azimuth provided by the equisignal path of the localizer. The combination of localizer and glide path information indicated on the proper instruments in the airplane cockpit provide the pilot with sufficient information to approach the runway in the correct direction and to bring the aircraft down to earth along a glide path that will provide a safe landing. In the GCA system the information concerning the course of the aircraft approaching for landing is obtained by presenting a picture of the instantaneous position of the aircraft in relation to the approach landing strip, by portraying on cathode ray tube indicators the azimuth, elevation and range of said aircraft. The narrow fan-like beams of radiated energy, one scanning in azimuth and the other in elevation locate the airplane in an area 20° wide in azimuth and up to 6° above the horizon in elevation within a range of 10 miles. Information concerning the approach is radioed to the pilot of the incoming aircraft and in response thereto he manipulates the aircraft controls until the aircraft lands. In both cases the pilot through the information given him by the instruments or by radio communication from the airport control tower controls the landing of the aircraft. There is a need for an aircraft landing system of high accuracy and adapted to automatic control of the aircraft during the landing process. It is of course essential in such a system that the approaching aircraft follow exactly and automatically the landing path until the aircraft is near the airport and the pilot takes over the control of the plane.

It is therefore an object of this invention to provide a system of high accuracy for landing aircraft at an airport.

A further object is to provide a landing system which automatically controls the direction of movement of the aircraft in response to signals from the transmitter.

Still another object is to provide a beacon for guiding missiles for landing at a specific point.

A feature of this invention is that the guidance beam is in the form of a conical scan signal generated about a nutating axis.

Another feature is the use of a modified proportional navigational system to maintain the course of the landing aircraft in substantial coincidence with the nutating axis and always within the scanning beam.

The above-mentioned and other features and objects of this invention will become more apparent by reference to the following description taken in conjunction with the accompanying drawings, in which.

Figure 1:
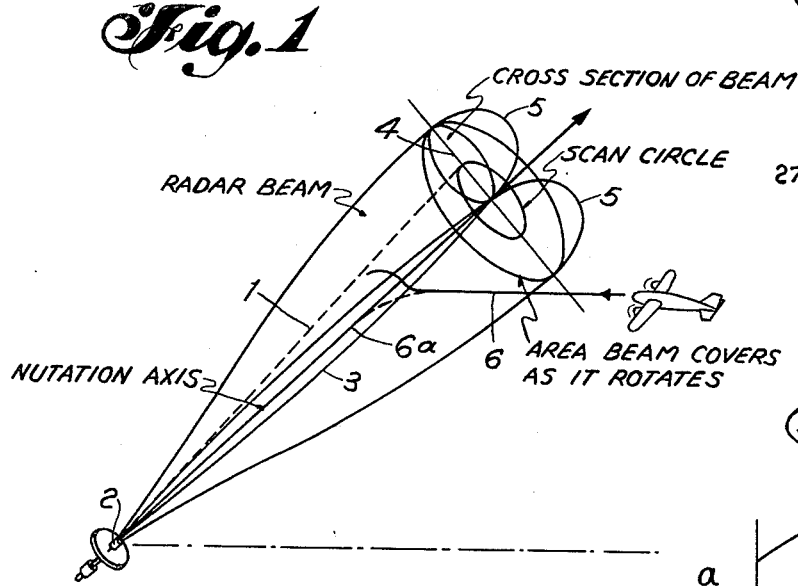
FIG. 1 is an isometric view of the radiation pattern of a radar conical scan antenna.
Figure 2:
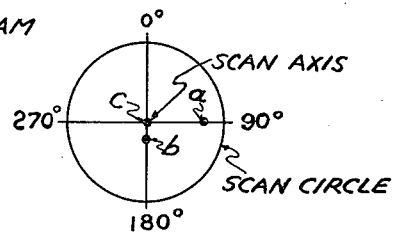
FIG. 2 is a plan view of the scan circle.
Figure 4:
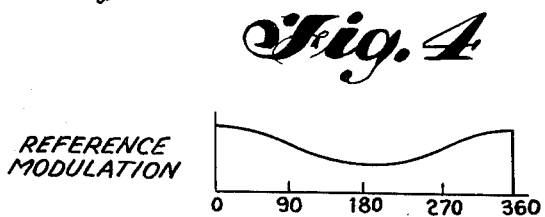
FIG. 4 is a graph of the reference modulation of the received signal versus angular position of the antenna of the airborne receiver.
Figure 3:
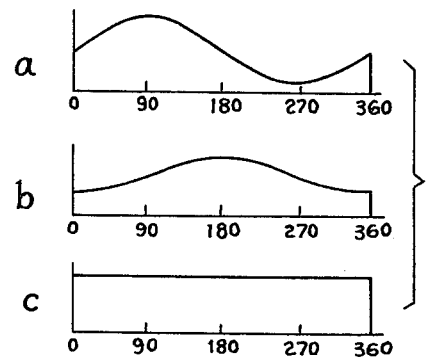
FIG. 3 shows graphs of the amplitude modulation of the received signal versus angular position of the antenna of the airborne receiver.

A conical scan beam guidance system is a system for guidance of aircraft which utilizes a conical scan of radiated energy in space. The RF pulses which are transmitted are of constant amplitude and have a pulse repetition rate which is frequency modulated at 50 c.p.s. Referring to FIG. 1, the center of the radar beam 1 which is generated by the transmitting antenna 2 is pointed at an angle called the squint angle from the scan axis 3 or nutating axis, and the beam is nutated so that the center of the beam follows the scan circle 4 as it nutates. Lobes 5 show the limits of the maximum intensity of the beam. Referring to FIGS. 2 and 3 if a receiver were placed on the scan axis 3, shown as point c, the signal strength measured by the receiver would be constant as the beam circles the scan axis in its scan. If the receiver were displaced slightly from the axis, the amplitude of the received signal would be modulated at the scan frequency of the scanning antenna. When the receiver antenna is displaced from the scan axis at point a, a sine wave modulation is observed in the amplitude of the received signal with the phase of the modulation such that the maximum signal amplitude is about 90°. Correspondingly, with the receiver-antenna at point b, we find the modulation reduced in amplitude and the phase of modulation has changed so that the maximum amplitude of the received signal is at 180°. At the center c with the receiver-antenna on the scan axis, the received signal is constant and no modulation exists. The change in the AM amplitude determines the amount of error or deviation from the scan axis; however, the direction of error must be obtained. The phase difference between the AM signal and the FM signal developed by the pulse repetition rate indicates the direction from the desired path. By comparing the phase relationships between each of the amplitude modulations with the reference FM modulation, the directions of errors may readily be observed.

Conventionally, this type of beam guidance is used for guidance of guided missiles. Since the missile is ordinarily introduced at the narrow part of the cone and travels outwardly toward increasing cone diameter, it is relatively simple to keep the missile within the confines of the beam. However, when we try to use this conical scan beam in the inverted sense, that is, to guide an aircraft toward the apex of the cone, then the problem is more complex. If we use a nutating antenna in the ground transmitter, we should be able to use very wide beam widths since the aircraft is now riding in on the beam; absolute distance accuracy is increasing with decreasing range to the transmitter. Moreover, a wide beam width is desirable for acquisition reasons in such a system. When the aircraft first enters the antenna pattern, the reaction of the steering mechanism would be to direct the aircraft toward the nutating axis and hence in this case upwards away from the antenna shown by the solid line 6, in FIG. 1. This is an unwanted effect. It is necessary that the path of the aircraft to be directed downward along the nutating axis. It would then be necessary to control the altitude of the aircraft so that is would always be directed downward towards the transmitter as shown by the dotted line 6a.

Figure 5:
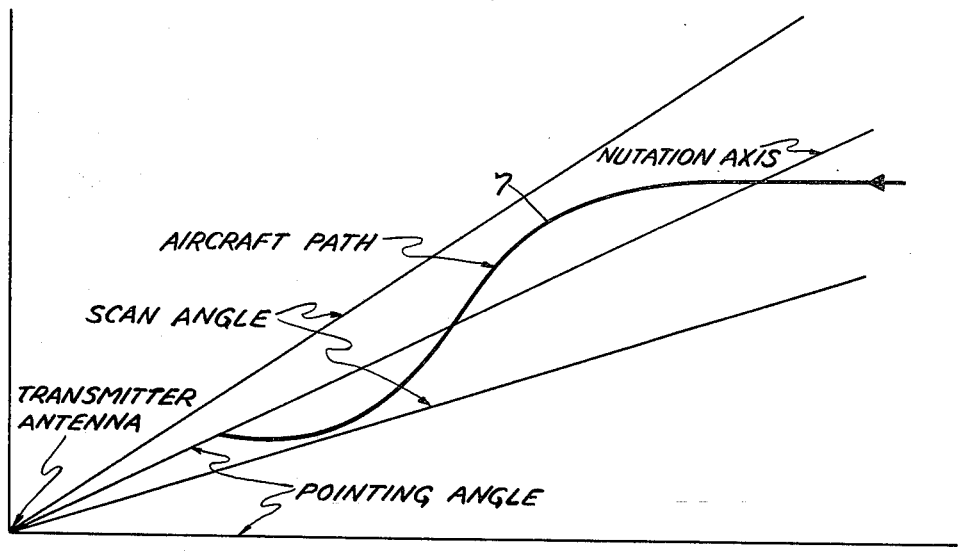
FIG. 5 is a graphic analysis of the path of a landing aircraft using the nominal system of beam guidance.

A graphical analysis of the aircraft path during the landing phase depicts the disadvantage of the inverted system when utilizing the type of naviagation scheme used in normal beam-riding guidance systems. Referring to FIG. 5, the curve 7 was constructed using the fact that the turning rate of the aircraft is proportional to the percent of amplitude modulation. The maximum practical turning rate of the aircraft was calculated from physical conditions and was assumed to occur at the angular displacement representing 70% amplitude modulation. Other turning rates were considered directly proportional to the per cent of amplitude modulation. FIG. 5 is a two-dimensional plot for a particular beamwidth, scan angle, pointing angle, and initial aircraft altitude. Although this Figure may appear to be restricted, it is quite representative of paths for an incoming aircraft in a nominal beam-riding system. As can be seen, the path under these conditions is a damped sinusoid. At the last turning rate indicated on the curve, the angle between the aircraft path and nutation axis appears to become even larger than the initial angle. The indicated aircraft path is not one to be desired, since this oscillation will result in a high rate of misses. It is to be noted that the aircraft is almost out of the beam at the peak of one cycle.

It is evident that an inverted-type beam-riding system for aircraft landing has defects which would make it impractical for such purpose. However, a landing system can be derived from the conical-scan pattern, which will utilize the total portion of the radiation volume, eliminate severe oscillations in the path of the aircraft, and will simplify the design of the aircraft receiver. This is accomplished in this invention by using a modified form of proportional navigation.

Previous studies have shown that proportional navigation is the most desirable type of guidance system for homing purposes. The principle involved in proportional navigation is that the rate of change of the aircraft direction of movement from a reference line in space be proportional to the rate of change of the line of sight from the aircraft to the conical scan radiating antenna with the same reference line, or, mathematically, $$\dot{\gamma} = (b+1)\dot{\alpha},$$

where $\dot{\gamma}$ = the rate of change of the direction of movement of the aircraft with respect to a reference line, in this case, the nutation axis of the conical scan
$b + 1$ = the navigation constant
$\dot{\alpha}$ = the rate of change of the line of sight with respect to the reference line.

In order to use the conical-scan radiation pattern for proportional navigation, the information that must be extracted from it is the rate of change of the line of sight with respect to the reference line. A modified form of this information can be obtained from the amplitude of the fundamental of the scan frequency.

It is necessary to derive the expression for the amplitude of the fundamental of scan frequency due to nutating in space the antenna pattern produced by a uniformly illuminated circular current sheet, corresponding to the pattern produced by a broad-beam conically scanning horn. The amplitude of the fundamental is expressed in a power series in $\alpha$, the angle between the line of sight between the aircraft and the radiating antenna nutation axis, in order to facilitate its incorporation in the modified control law of proportional navigation.

The normalized radiation pattern for a uniform circular current sheet is given by the equation $$E = (1 + \cos \theta) \frac{J_1(Ka \sin \theta)}{Ka \sin \theta},$$

where
$a$ = The radius of the antenna
$K = 2\pi/\lambda$
$\lambda$ = The wavelength of the transmitted frequency.

Figure 6:
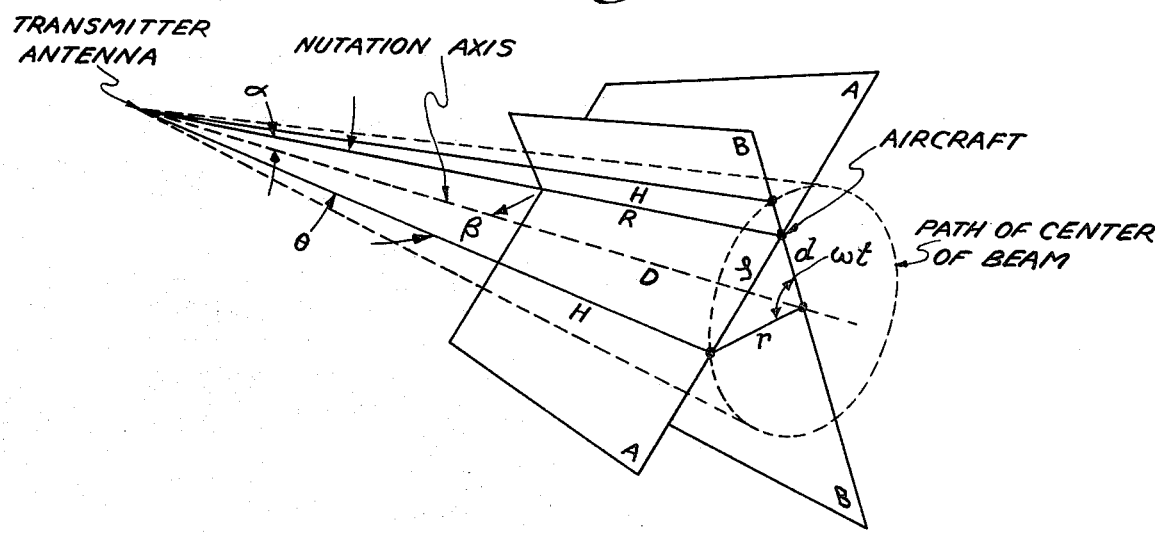
FIG. 6 is an isometric view of the geometry of the beam guiding system herein.

Referring to FIG. 6, $\alpha$ is the angle between the line of sight from the aircraft to the radiating antenna and the nutation axis. $\beta$ is the angle betweeen the nutation axis and the beam center, or the squint angle; $\theta$ is the angle between the beam center and the line of sight and $\omega t$ is the instantaneous angle between $r$ and $d$.

It is required to solve for $\sin \theta$ and $\cos \theta$ in terms of $\omega t$ and $\alpha$ and substitute these into the radiation pattern in order to obtain an expression for the signal received at a point in time and space due to conical scanning. The following is applicable only to symmetrical radiation patterns.

To find the variation of $\sin \theta$ with $\omega t$ and $\alpha$, apply the law of cosines to FIG. 6.
1. $\tau^2 = H^2 + R^2 - 2HR \cos \theta$
2. $\tau^2 = r^2 + d^2 - 2rd \cos \omega t$
The following relationships result.
3. $D = R \cos \alpha$ 4. $H = \dfrac{D}{\cos \beta} = R \dfrac{\cos \alpha}{\cos \beta}$ 5. $r = H \sin \beta = R \dfrac{\cos \alpha}{\cos \beta} \sin \beta$ 6. $d = R \sin \alpha$ Substitutions of Equations 3–6 into Equations 1 and 2 and equating $\tau$ yields the following: 7. $\cos \theta = \cos \alpha \cos \beta + \sin \alpha \sin \beta \cos \omega t$ and
8. $\sin \theta = \{1 - [\cos \alpha \cos \beta + \sin \alpha \sin \beta \cos \omega t]^2\}$, $\omega t$ is the argument of the scan frequency.

The radiation pattern for a circular current sheet is given by $$9.\ E_p = \frac{aE}{2R}(1 + \cos \theta) \frac{J_1(Ka \sin \theta)}{\sin \theta},$$

where $K = 2\pi/\lambda$
$\lambda$ = the wavelength of the radiated frequency
$a$ = the radius of the current sheet.

Equations 7 and 8 are expressions relating the angle between the line of sight and the beam axis, $\theta$, to the angle between the line of sight and the nutation axis, $\alpha$, and time. If Equations 7 and 8 are substituted in Equation 9, the expression obtained is the signal received by the aircraft at some time, $t$, and angle, $\alpha$.

10. $E_s = aE/2R\ (1 + \cos \alpha \cos \beta + \sin \alpha \sin \beta \cos \omega t)$ $$\frac{J_1\{Ka\ (1 - [\cos \alpha \cos \beta + \sin \alpha \sin \beta \cos \omega t]^2)^{1/2}\}}{\{1 - [\cos \alpha \cos \beta + \sin \alpha \sin \beta \cos \omega t]^2\}^{1/2}}$$

Expressing Equation 10 with $J_1(x)$ in its series form:
11. $E_s = aE/2R\ (1 + \cos \alpha \cos \beta + \sin \alpha \sin \beta \cos \omega t)$ $$\left\{ \frac{1}{2} - \frac{(\frac{1}{2})^3}{1^2 \cdot 2}(Kax)^2 + \frac{(\frac{1}{2})^5}{1^2 \cdot 2^2 \cdot 3}(Kax)^4 \ldots \right\},$$

where $x = \{1 - [\cos\alpha \cos\beta + \sin\alpha \sin\beta \cos\omega t]^2\}$.

It was found that the first four terms of the Bessel function would approximate the signal to within a few per cent when the beam widths or 90° or less were considered and a wavelength of 2 inches was used.

Equation 11 can be expressed as a constant term and harmonics of the function $\cos\omega t$. Solving for the fundamental ($\cos\omega t$), 12. Fundamental $\approx \left\{ \frac{1}{2} S + \frac{K^2 a^2}{16} S \left[ \frac{3}{4} S^2 + (3C-1)(C+1) \right] + \right.$ $+ \frac{K^4 a^4}{384} S \left[ \frac{5}{8} S^4 + \left( \frac{15}{2} C^2 + 3C - \frac{3}{2} \right) S^2 + (5C-1)(C+1)^2(C-1) \right] +$ $+ \frac{K^6 a^6}{18,432} S \left[ \frac{35}{64} S^6 + \left( \frac{105}{8} C^2 + \frac{15}{4} C - \frac{5}{8} \right) S^4 + \left( \frac{105}{4} C^4 + 15C^3 - \right.\right.$ $\left.\left. - \frac{45}{2} C^2 - 9C + \frac{9}{4} \right) S^2 + (7C-1)(C+1)^3(C-1)^2 \right] \right\} \cos\omega t$ , where $S = \sin\alpha \sin\beta$, $C = \cos\alpha \cos\beta$.

Equation 12 gives the amplitude of the fundamental of the conical-scan frequency as a nonlinear function of $\alpha$. For use in a proportional navigation type of guidance system we would like to see how the fundamental varies as $\alpha$. Substituting the series expansions for $\cos\alpha$ and $\sin\alpha$ in Equation 12 and simplifying will result in a power series in $\alpha$.

13. Fundamental $\approx \left\{ \frac{1}{2} S^1 + \frac{K^2 a^2}{16} S_1 [(3C_1-1)(C_1+1)] + \right.$ $+ \frac{K^4 a^4}{384} S_1[(5C_1-1)(C_1+1)^2(C_1-1)] + \frac{K^6 a^6}{18,432} S_1$ $[(7C_1-1)(C_1+1)^3(C_1-1)^2] \right\} \alpha + \left\{ - \frac{1}{2} S_1 + \frac{K^2 a^2}{16} \right.$ $S_1[-3.5C_1^2 - 2.33\, C_1 + 0.167] + \frac{K^4 a^4}{384} S_1[S_1^2(7.5C_1^2 +$ $+ 3C_1 - 1.5) - 0.167(65C_1^4 + 40C_1^3 - 42C_1^2 - 16C_1 + 1)] +$ $+ \frac{K^6 a^6}{18,432} S_1 [-0.167(133C_1^6 + 96C_1^5 - 195C_1^4 - 120C_1^3 +$ $+ 63C_1^2 + 24C_1 - 1)] \right\} \alpha^3 + \left\{ \frac{K^2 a^2}{16} S_1 \left[ \frac{0.167}{2}(15C_1^2 + 2C_1) \right] + \right.$ $+ \frac{K^4 a^4}{384} S_1 \left[ S_1^2(-135C_1^2 - 36C_1 + 9)(\frac{1}{12}) + \frac{1}{12}(110C_1^4 +$ $+ 48C_1^3 - 30C_1^2 + 4C_1) \right] + \frac{K^6 a^6}{18,432} S_1 \left[ \frac{1}{12}(357C_1^6 + 210C_1^5 -$ $\left. - 330C_1^4 - 144C_1^3 + 45C_1^2 + 6C_1) \right] \right\} \alpha^5$ , where $S_1 = \sin\beta$, $C_1 = \cos\beta$
From the above we have for values of beamwidth = 30°, 45°, and 60°

| | |
|---|---|
| $F = 1.99\alpha - 8.44\alpha^3 + 16.9\alpha^5$ | $2\beta = 30°$ |
| $F = 1.27\alpha - 2.67\alpha^3 + 2.67\alpha^5$ | $2\beta = 45°$ |
| $F = 0.868\alpha - 1.22\alpha^3 + 9.565\alpha^5$ | $2\beta = 60°$ |

If the fixed nutation axis is chosen as the reference line, a modified form of the proportional navigation equation may be written; i.e., we make the aircraft turning rate proportional to the rate of change of the amplitude of the fundamental of the scan frequency.

14. $\dot{\gamma} = (b \div 1) \dot{F}$, where $F$ = the amplitude of the fundamental of the scan frequency
 $= a_1 \alpha \div a_2 \alpha^3 \div a_3 \alpha^5 \div \ldots$ $\dot{F}$ = the rate of change of the amplitude of the fundamental.

It was found that the amplitude fundamental could be approximated to within a few per cent by the first three terms in the series for a wavelength of 2 inches and beamwidths of interest. Therefore, $\dot{F} \approx a_1 \alpha \div a_2 \alpha^3 \div a_3 \alpha^5$.

Expressing Equation (14) in terms of $\alpha$ we have

15. $\ddot{\gamma} = (b \div 1)(a_1 \div 3a_2 \alpha^2 \div 5a_3 \alpha^4) \ddot{\alpha} = (b \div 1) N_r \alpha$, where $N_v$ = proportionality function.

The variation between this control law and that of straight proportional navigation is that the navigation constant is now a function of $\alpha$. If the crossover point of the antenna pattern is chosen (a crossover of 3 db was used), the coefficients $a_1$, $a_2$ and $a_3$ become functions of the antenna beamwidth. Numerical calculations showed that the signs of $a_1$ and $a_3$ were positive; however, the sign of $a_2$ was negative.

The proportionality function has been plotted against $\alpha$ for values of beamwidth equal to 30°, 45°, and 60° and it has been ascertained that $N_v$ decreases with increasing $\alpha$, thereby effectively lowering the navigation constant when the aircraft is far off the nutation axis. It would not be necessary for the aircraft to ride down the nutation axis in this system; any line of constant scan-modulation level would be satisfactory.

To minimize the variation in navigation, constant steering information would be used only after the per cent modulation had decreased to a value corresponding to the desired lower limit of $N_c$.

If we have a system with a beamwidth of 45° and wish to restrict the navigation constant to between 2 and 3 (optimum value is probably 2.5), we could utilize 27°, or approximately 60% of the squint angle. For a 60° beamwidth we could use approximately 33°, or 55% of the squint angle.

Figure 7:
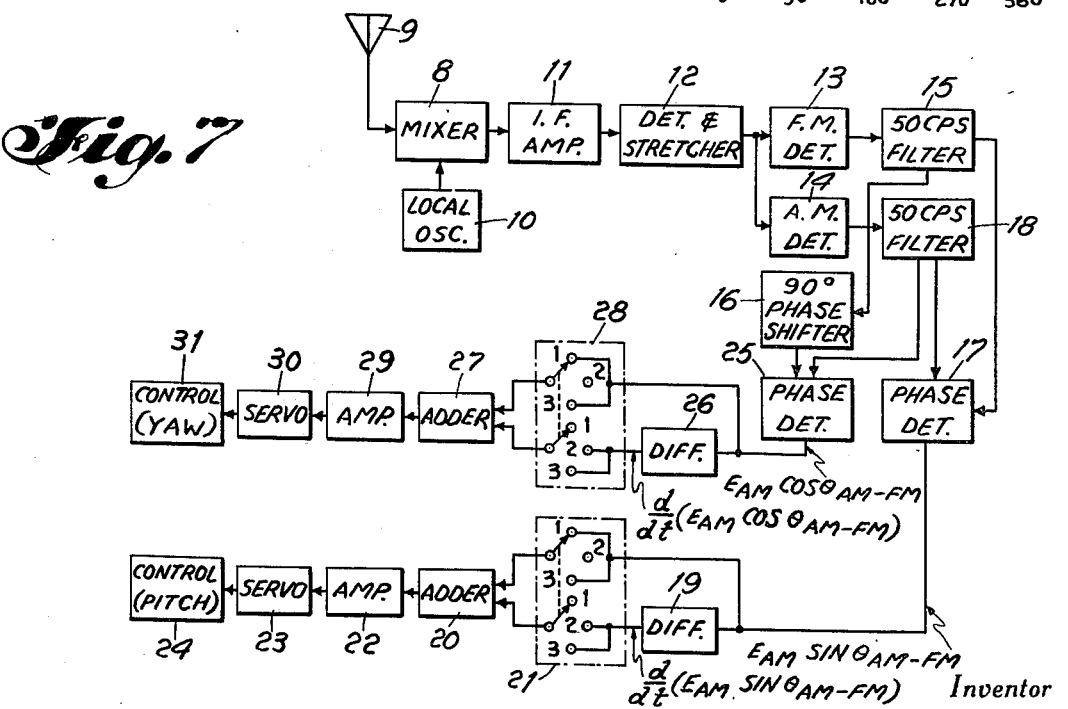
FIG. 7 is a block diagram of the airborne receiver of this system.

Referring to FIG. 7 there is shown a conventional mixer 8 to which is coupled a single antenna 9 adapted to receive the pulses of the scanning beam, and a local oscillator 10. The output of the mixer 8 is fed to an intermediate frequency amplifier 11 whose output is then fed into a detector and stretcher 12, where the intermediate frequency is converted into video frequency. The output of the detector 12 is fed into a FM detector 13 and an AM detector 15. The output of the FM detector 13 is the frequency modulation of the received signal which is used as a reference for phase detection and is coupled to a 50 c.p.s. filter 15. The output of the filter 15 is then fed into a 90° phase shifter 16 and the phase detector 17. The AM detector 14 output is coupled to a 50 c.p.s. filter 18 to derive the clear AM component of the received signal. This signal is then fed into the phase detector 17 and a DC error output voltage $E_{AM}\sin\theta_{AM-FM}$ is obtained by comparing the phase difference between the FM modulation and the AM signal. A first differentiator 19 is coupled to the phase detector 17. The differentiator 19 differentiates the error output of phase detector 17 to produce the voltage $d/dt\ (E_{AM}\sin\theta_{AM-FM})$. This differentiated voltage and the output of the phase detector 17 are coupled to a first adder 20, of the type for example described at pages 663–664 in the publication "Electronic and Radio Engineering," by F. E. Terman, published by McGraw Hill Book Company, Inc., Fourth Edition, 1955, by means of a three-position, two-section switch, 21. When switch 21 is at position 1, only the error signal output of phase detector 17 is passed to the adder 20. At position 2 the only input to the adder 20 is the output of the differentiator 19, and at position 3 both the error voltage and the differentiated voltage are fed into the adder 20. The output of the adder 20 is amplified by the linear amplifier 22 to sufficient magnitude to energize a servo 23. Servo 23 operates a navigational control 24 of the aircraft to modify the vertical component, or the pitch, of the direction of the aircraft. The AM output of the filter 18 and the 90° phase shifted FM output are coupled to a phase detector 25. The 90° phase shift of the FM signal is required to obtain the horizontal error voltage $E_{AM}\cos\theta_{AM-FM}$, and the output of the phase detector 25 is then fed to a second differentiator 26. The differentiated output of differentiator 26, $d/dt\ (E_{AM}\cos\theta_{AM-FM})$ and the output of the phase detector 25 are coupled to a second adder 27 by the three-position, two-section switch 28. At position 1 of the switch 28 only the error voltage output of the phase detector 25 passes into the adder 26, at position 2 only the output of the differentiator 25 is passed by the switch 28 and at position 3 the outputs of both phase detector 25 and differentiator 26 are fed into the adder 27. Adder 27 is coupled to amplifier 29 whose output is of sufficient magnitude to energize the servo 30 to operate a second navigational control 31 of the aircraft to vary the yaw, or horizontal direction, of the aircraft flight. When the switches 21 and 28 are in position 1, the position of the aircraft in the scanning beam may be determined. When the aircraft is in the proper position in the scanning beam automatic guidance can be obtained by switching either to position 2 or position 3. Position 2 would allow proportional navigation only, position 3 would allow any combination between conventional beam guiding and proportional navigation. The proper choice of constants in the circuits of the adders 20 and 27 would be a function of the error signal developed.

The motion of the navigational controls 24 and 31 is in the direction and amount required to bring the aircraft back to the conical scan guidance beam. As the aircraft returns to the desired path, the error becomes smaller and the amount of correction becomes smaller. When the aircraft is back at any line of constant scan-modulation the error is zero, the correction is zero and the controls 24 and 31 are back in their neutral position. Any overshooting past the line of constant scan-modulation is corrected in the same manner as the original error.

While I have described above the principles of my invention in connection with specific apparatus, it is to be clearly understood that this description is made only by way of example and not as a limitation to the scope of my invention as set forth in the objects thereof and in the accompanying claims.

I claim:

1. A system adapted to guide an aircraft along a path defined by frequency modulated signals of a transmitted conical scan pattern, comprising a receiver carried by said aircraft to receive said signals, means to detect from said signals and the amplitude modulation of said signals carried by the movement of said aircraft relative to the axis of said conical scan pattern any rate of change of the direction of movement of said aircraft with respect to the nutation axis of said conical scan pattern, and means responsive to said detected rate of change to direct the movement of said aircraft along a path within said conical scan pattern defined by any line of constant scan modulation.

2. An aircraft guiding system comprising means to transmit frequency modulated signals in a conical scan electromagentic field pattern defining an aircraft guiding path, a receiver carried by an aircraft moving along said path, said receiver comprising means to receive said signal, means to detect from said signals and the amplitude modulation of said signals caused by the said movement of said aricraft relative to the axis of said conical scan pattern any rate of change of the directional movement of said aircraft with respect to the nutation axis of said conical scan pattern and means responsive to said detected rate of change to direct the movement of said aircraft along a path within said conical scan pattern defined by any line of constant scan modulation.

3. An aircraft landing system comprising means to transmit frequency modulated signals in a conical scan electromagnetic field pattern defining an aircraft landing approach path, a receiver carried by a aircraft moving in the vicinity of said path, said receiver comprising means to receive said signals, means to detect from said signals and the amplitude modulation of said signals caused by the movement of said aircraft relative to the axis of said conical scan pattern any rate of change of the direction of movement of said aircraft with respect to the nutation axis of said conical scan pattern and means responsive to said detected rate of change to direct the movement of said aircraft along a path within said conicjal scan pattern defined by any line of constant scan modulation.

4. A system adapted to guide an aircraft along the path defined by frequency modulated signals transmitted by an antenna in a conical scan electromagnetic field pattern comprising a receiver carried by said aircraft to receive said signals, means to detect from said signals and the amplitude modulation of said signals caused by the movement of said aircraft relative to the axis of said conical scan pattern any rate of change of the angle between the line of sight from said aircraft to said antenna and the nutation axis of said conical scan pattern, and means responsive to said detected rate of change to direct the movement of said aircraft along a path within said conical scan pattern defined by any line of constant scan modulation.

5. A system adapted to guide an aircraft along a path defined by frequency modulated signals of a transmitted conical scan field pattern comprising a receiver carried by said aircraft to receive said signals, means to detect from said signals and the amplitude modulation of said signals caused by the movement of said aircraft relative to the axis of said conical scan pattern any rate of change of the amplitude of the fundamental of the scan frequency of said conical scan and means responsive to said detected rate of change to direct the movement of said aircraft along a path within said conical scan pattern defined by any line of constant scan modulation.

* * * * *